United States Patent
Sorin et al.

(10) Patent No.: US 7,843,629 B2
(45) Date of Patent: Nov. 30, 2010

(54) PERIODICALLY FILTERED BROADBAND LIGHT SOURCE

(75) Inventors: Wayne V. Sorin, Mountain View, CA (US); Hee-Yeal Rhy, Daejeon (KR); Pavle Sedic, Santa Clara, CA (US)

(73) Assignee: Novera Optics, Inc., Santa Clara, CA (US)

(*) Notice: Subject to any disclaimer, the term of this patent is extended or adjusted under 35 U.S.C. 154(b) by 160 days.

(21) Appl. No.: 11/726,803

(22) Filed: Mar. 22, 2007

(65) Prior Publication Data
US 2008/0231943 A1    Sep. 25, 2008

(51) Int. Cl.
*H04B 10/17* (2006.01)
*H01S 3/10* (2006.01)
*H04B 10/12* (2006.01)

(52) U.S. Cl. ..................... 359/337.2; 372/23
(58) Field of Classification Search ........... 359/337.2, 359/344; 372/23
See application file for complete search history.

(56) References Cited

U.S. PATENT DOCUMENTS

| | | | | |
|---|---|---|---|---|
| 5,793,049 | A | * | 8/1998 | Ballard ................... 250/458.1 |
| 6,091,744 | A | * | 7/2000 | Sorin et al. ................. 372/20 |
| 6,163,553 | A | * | 12/2000 | Pfeiffer ........................ 372/6 |
| 6,195,200 | B1 | * | 2/2001 | DeMarco et al. ....... 359/337.21 |
| 6,567,430 | B1 | * | 5/2003 | Islam et al. .................... 372/3 |
| 6,674,929 | B2 | * | 1/2004 | Feng et al. ................... 385/15 |
| 6,728,274 | B1 | * | 4/2004 | Sousa et al. .................. 372/20 |
| 2002/0012366 | A1 | * | 1/2002 | Ahmadvand et al. .......... 372/23 |
| 2002/0071173 | A1 | * | 6/2002 | Lee et al. ................. 359/337.1 |
| 2002/0159116 | A1 | | 10/2002 | Shiozaki et al. |
| 2003/0007207 | A1 | * | 1/2003 | Healey et al. ............... 359/124 |
| 2003/0035617 | A1 | | 2/2003 | Plourde et al. |

(Continued)

FOREIGN PATENT DOCUMENTS

EP    0 896 447 A2    2/1999

(Continued)

OTHER PUBLICATIONS

Daniel Pastor, et al., "Flexible and Tunable Microwave Filters Based on Arrayed Waveguide Gratings," XP010623153, Microwave Photonics, 2002, pp. 189-192 (Nov. 5, 2002).

(Continued)

*Primary Examiner*—Eric Bolda
(74) *Attorney, Agent, or Firm*—Blakely, Sokoloff, Taylor & Zafman LLP (57) ABSTRACT

Embodiments of a periodically filtered broadband light source are described. The periodically filtered broadband light source includes a periodic spectral filter coupled to an optical gain element to generate a light and to filter the light into a plurality of individual spectral slices. The broadband light source includes an isolator coupled to the optical gain element. The periodic filter can be a reflective filter. The periodic filter can adjust an optical power in each of the spectral slices. The periodic filter can include one or more control elements to control an optical power in each of the spectral slices. Further, a wavelength division multiplexing passive optical network system is described that includes the periodic broadband light source to send individual spectral slices to wavelength lock one or more transceivers. The individual spectral slices sent by the periodic broadband light source match wavelength channels of a wavelength division multiplexer/de-multiplexer.

16 Claims, 6 Drawing Sheets

U.S. PATENT DOCUMENTS

2004/0135172 A1* 7/2004 Yoshida et al. .............. 257/200

FOREIGN PATENT DOCUMENTS

| EP | 0 930 679 A2 | | 7/1999 |
|---|---|---|---|
| EP | 930679 A2 | * | 7/1999 |
| WO | WO 2006/052075 A1 | | 5/2006 |
| WO | WO 2006/068335 A1 | | 6/2006 |
| WO | WO 2007/027042 A1 | | 3/2007 |

OTHER PUBLICATIONS

PCT Notification of Transmittal of the International Search Report and the Written Opinion of the International Searching Authority or The Declaration for PCT Counterpart Application No. PCT/US2008/003557 Containing International Search Report, 16 pgs (Feb. 5, 2009).

* cited by examiner

PERIODICALLY FILTERED BROADBAND LIGHT SOURCE

FIELD OF THE INVENTION

Embodiments of the invention relate to Wavelength Division Multiplexing Passive Optical Networks ("WDM-PONs"), and more specifically, to a broadband light source.

BACKGROUND

A typical WDM-PON system has passive optical components, e.g., fibers, splitters and couplers, to guide traffic between an optical line termination ("OLT") unit located at a Central Office ("CO") and remote Optical Network Units ("ONUs") located at customer premises. The WDM-PON system may use a broadband light source ("BLS") that produces light having a continuous spectrum and uniform power spectral density.

Figure 1A:
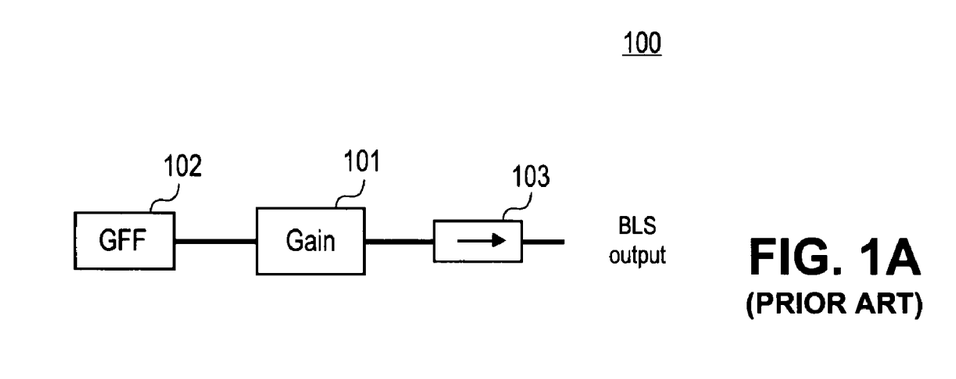
FIG. 1A shows a block diagram of a typical prior art broadband light source.

FIG. 1A shows a block diagram of a typical broadband light source. As shown in FIG. 1A, broadband light source 100 consists of a gain element 101, a gain flattening filter ("GFF") 102, and an isolator 103. Gain element 101, such as an erbium doped fiber amplifier ("EDFA") or semiconductor optical amplifier ("SOA") is used to generate amplified spontaneous emission ("ASE") that is continuous over a specified wavelength band. GFF 102 is typically used to flatten the continuous ASE spectrum. Isolator 103 is used to prevent reflections from affecting the output power and spectral shape of the light from BLS 100.

Figure 1B:
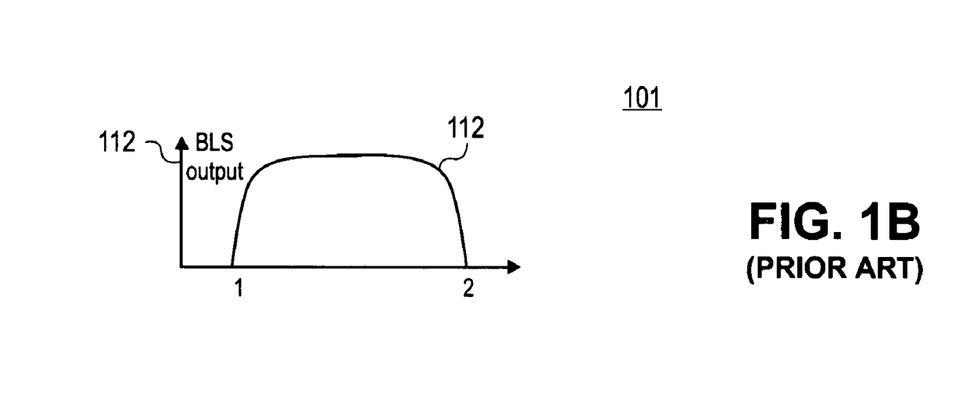
FIG. 1B shows a diagram illustrating dependence of an output power of a typical prior art broadband light source on a wavelength.

FIG. 1B shows a diagram illustrating dependence of an output 112 of BLS 100 on a wavelength $\lambda$. As shown in FIG. 1B, output 112 of BLS 100 has a continuous spectrum. The output 112 of BLS 100 is uniform over a continuous range $\lambda_2 - \lambda_1$ of wavelengths $\lambda$, as shown in FIG. 1B.

Broadband light source 100 with a continuous spectrum output typically causes many problems that limit the performance of the WDM-PON system. One of the problems is the increased optical crosstalk between adjacent optical channels in a WDM-PON. Another problem is that the peak spectral density in each wavelength channel is limited by the total output power that can be extracted from the gain element in a BLS device. Further, the wavelength accuracy of the channel filtering in the WDM-PON typically can be difficult to maintain in low-cost volume manufacturing. Additionally, the relative intensity noise ("RIN") on the BLS signal can limit the system performance.

SUMMARY

Embodiments of a periodic broadband light source ("BLS") and a Wavelength Division Multiplexing ("WDM") Passive Optical Network ("PON") are described. The periodic BLS includes a periodic spectral filter coupled to an optical gain element to generate light and to filter the light into a plurality of individual spectral slices. The broadband light source has an isolator coupled to the optical gain element. The periodic broadband light source can include a gain flattening filter coupled to the optical gain element.

For one embodiment, the periodic spectral filter is a reflective filter. For one embodiment, the light passes through the optical gain element of the periodic BLS not more than two times. For one embodiment, the periodic spectral filter of the periodic BLS adjusts an optical power in each of the spectral slices. For one embodiment, the periodic spectral filter of the periodic BLS has one or more optical power control elements coupled to control an optical power in each of the spectral slices.

For one embodiment, a WDM PON system includes a group of transceivers to send a first set of optical signals into a first direction along an optical transmission medium. A wavelength division multiplexer/de-multiplexer ("WDM MUX/De-MUX") is coupled to the group of transceivers. A first periodic BLS is coupled to the WDM MUX/De-MUX to send individual spectral slices of light into a second direction to wavelength lock one or more transceivers of the group. For one embodiment, an optical power within the individual spectral slices of the periodic BLS is adjusted. For one embodiment, a shape of the individual spectral slices generated by the periodic BLS is tailored. For one embodiment, locations of the individual wavelength slices generated by the periodic BLS are stabilized. The individual spectral slices generated by the periodic BLS match the wavelength channels of the WDM MUX/De-MUX.

The WDM PON system can include a control unit coupled to the group of transceivers and to the periodic broadband light source to control an optical power in each of the individual spectral slices. Further, a WDM PON system can include a second group of transceivers to send a second set of optical signals into the second direction along the optical transmission medium. A second WDM MUX/De-MUX is coupled to the second group of transceivers. A second periodic broadband light source is coupled to the second WDM MUX/De-MUX to send second individual spectral slices of the light into the first direction to wavelength lock one or more transceivers of the second group. The second individual spectral slices generated by the second periodic BLS match the wavelength channels of the second WDM MUX/De-MUX.

Other features and advantages of embodiments of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, in which.

DETAILED DESCRIPTION

Embodiments of a periodic broadband light source ("BLS") and a Wavelength Division Multiplexing ("WDM") Passive Optical Network ("PON") that uses the periodic broadband light source are described. The periodic broadband light source includes a periodic spectral filter coupled to an optical gain element to generate light and to filter the light into a plurality of individual spectral slices. For one embodiment, the optical gain element has a substantially fast response time to reduce the relative intensity noise ("RIN") on each individual spectral slice, as described in further detail below. The broadband light source has an isolator coupled to the optical gain element. For one embodiment, the periodic broadband light source of the periodic BLS includes a gain flattening filter coupled to the optical gain element. The periodic spectral filter of the periodic BLS is a wavelength stabilized filter. For one embodiment, the periodic spectral filter of the periodic BLS is a reflective filter. For one embodiment, the light passes through the optical gain element not more than two times. The periodic spectral filter of the periodic BLS can adjust an optical power in each of the spectral slices. For one embodiment, the periodic spectral filter of the periodic BLS has one or more optical power control elements coupled to control an optical power in each of the spectral slices. For one embodiment, the periodic spectral filter and the optical power control elements of the periodic BLS are combined into a single integrated optical chip, as described in further detail below. For another embodiment, the periodic spectral filter of the periodic BLS is a reflective etalon.

Figure 2A:
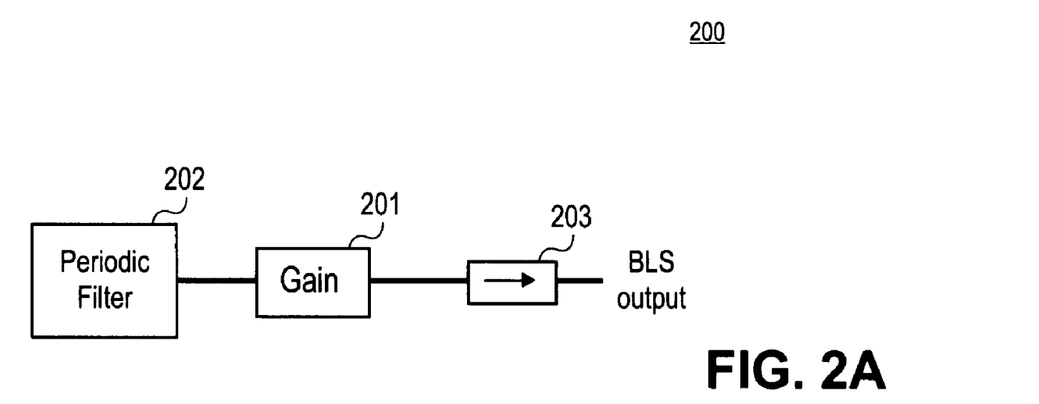
FIG. 2A is a block diagram of one embodiment of a periodic broadband light source.

FIG. 2A is a block diagram of one embodiment of a periodic broadband light source ("BLS"). As shown in FIG. 2A, periodic BLS 200 includes an optical gain element 201, a periodic spectral filter 202, and an isolator 203. As shown in FIG. 2A, periodic spectral filter 202 is a reflective filter. Gain element 201 generates a broadband light, for example an amplified spontaneous emission ("ASE"). For one embodiment, gain element 201 is a gain medium without a mirror. As shown in FIG. 2A, periodic spectral filter 202 is connected to optical gain element 201. Periodic spectral filter 202 pre-filters the light produced by gain element 201 into a plurality of individual spectral slices. As shown in FIG. 2A, gain element 201 is configured to operate in a double-pass configuration. As shown in FIG. 2A, the individual spectral slices of the light are reflected back from periodic reflective filter 202 into gain element 201. That is, the light passes gain element 201 not more than two times. The reflected periodic individual spectral slices are output through isolator 203, as shown in FIG. 2A.

For one embodiment, periodic reflective filter 202 is a wavelength-stabilized filter, for example, an athermal arrayed waveguide ("AWG"). For another embodiment, one of active and passive wavelength stabilization techniques is used to stabilize the locations of the spectral slices in the presence of changing environmental factors, for example, temperature. These active and passive techniques are known to one of ordinary skill in the art of optical communication. Isolator 203 is used to prevent reflections from affecting the output power and spectral shape of the light from gain element 201. For one embodiment, periodic spectral filter 202 and gain element 201, e.g., a semiconductor optical amplifier, are grown on a single semiconductor chip. The semiconductor chip may contain, for example, silicon, silicon dioxide, indium phosphide, or any combination thereof. For one embodiment, periodic spectral filter 202 and gain element 201 are incorporated into a single Planar Lightwave Circuit ("PLC").

For one embodiment, periodic filter 202 includes an array of waveguides made of, e.g., silicon dioxide, that are grown on a semiconductor chip. For one embodiment, at the end of the semiconductor chip all ends of the waveguides of periodic filter 202 are metallized, so that the light is reflected back from the end of each of the waveguides. Each of the waveguides can have individually adjusted reflections. The spectral shape of the light reflected from the ends of each of the waveguides can be adjusted to, for example, flat topped, Gaussian, sinusoidal, or any other spectral shape. The spectral shape of the reflections may be adjusted using one of techniques known to one of ordinary skill in the art of optics manufacturing. For one embodiment, a metal coating (not shown) is deposited onto the output facet of the waveguides of the periodic filter 202. For one embodiment, the thickness of the metal coating varies from one waveguide to another waveguides of the periodic filter 202. For one embodiment, the ends of the waveguides that contain the central wavelengths of a wavelength range have metal coatings with lower reflectivity than the waveguides that contain the edge wavelengths of the wavelength range. For example, for the wavelength range between about 1535 nanometers ("nm") to about 1565 nm, the ends of the waveguides at about 1550 nm have metal coatings with lower reflectivity than the waveguides at about 1535 nm or 1565 nm. For one embodiment, to provide more reflection at the edge wavelengths, the metal coating at the end of waveguides at about 1535 nm and 1565 nm is thicker than the metal coating at the end of waveguides at about 1550 nm. For one embodiment, the metal coating is replaced by thin-film dielectric coatings. For another embodiment, a different loss mechanism can be included in each of the waveguides. The different loss mechanism can be included in each of the waveguides using a mask.

Figure 2B:
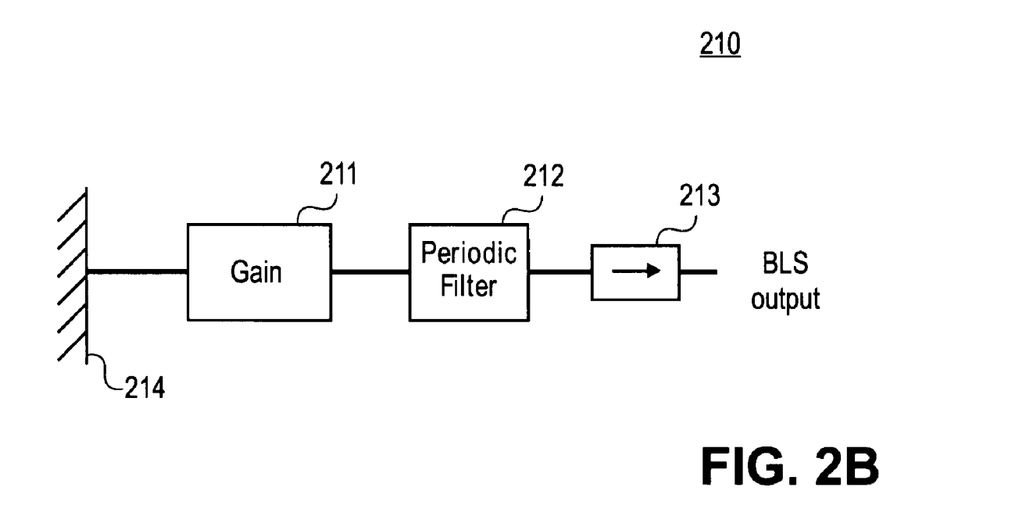
FIG. 2B is a block diagram of another embodiment of a periodic broadband light source.

FIG. 2B is a block diagram of another embodiment of a periodic broadband light source ("BLS"). As shown in FIG. 2B, periodic BLS 210 includes an optical gain element 211, a periodic spectral filter 212, an isolator 213, and a reflector 214. Gain element 211 generates a broadband light, for example an amplified spontaneous emission ("ASE"). As shown in FIG. 2B, gain element 211 is configured to operate in a double-pass configuration. The light is reflected back from reflector 214 into gain element 211. For one embodiment reflector 214 reflects substantially 100% of light and is wavelength independent.

That is, the light passes gain element 211 not more than two times. As shown in FIG. 2B, periodic spectral filter 212 is coupled to optical gain element 211 to filter the reflected light into a plurality of individual spectral slices. The reflected individual spectral slices are output through isolator 213, as shown in FIG. 2B. For one embodiment, periodic filter 212 is a wavelength-stabilized filter, for example, an athermal arrayed waveguide ("AWG"). For another embodiment, one of active and passive techniques is used to stabilize the locations of the spectral slices in the presence of changing environmental factors, for example, temperature. These active and passive techniques are known to one of ordinary skill in the art of optical communication. Isolator 213 is used to prevent reflections from affecting the output power and spectral shape of the light from gain element 212.

Figure 2C:
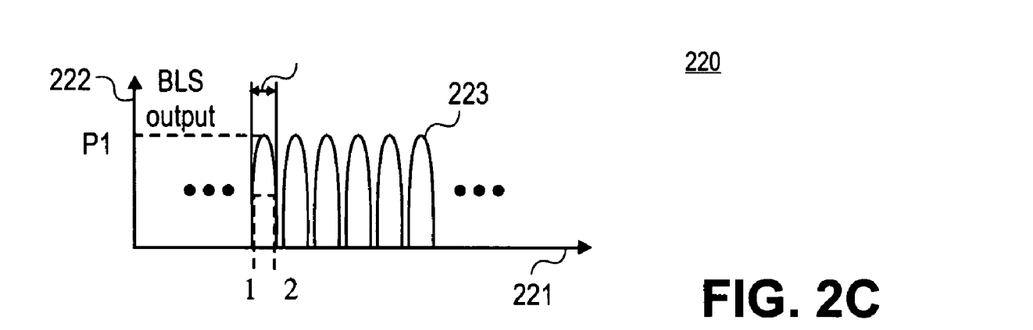
FIG. 2C is a diagram that illustrates dependence of an output of the periodic broadband light source on a wavelength.

FIG. 2C is a diagram that illustrates dependence of an output power of the periodic BLS 222 on a wavelength 221. As shown in FIG. 2C, the output of periodic BLS 222 has a combed spectrum with a plurality of individual narrowband spectral slices 223. These individual narrowband spectral slices 223 can be made to automatically match the channel locations and spectral widths of the individual channels in a WDM-PON system, as described in further detail below. For one embodiment, the locations of the reflected spectral slices 223 are aligned with the International Telecommunication Union ("ITU") wavelength grid (not shown). The distance between each of the reflected spectral slices 223 may be 50 Gigahertz ("GHz"), 100 GHz, 200 GHz, or any other distance.

For one embodiment, the shapes of the individual spectral slices 223 can be tailored, as described above, to improve the performance of a WDM-PON system. Example of possible shapes 223 are sinusoidal, Gaussian, and flat-topped. Providing periodic individual spectral slices 223 from the broadband light source can eliminate the crosstalk between the adjacent wavelength channels. Providing periodic individual spectral slices 223 can substantially double the optical power in each wavelength channel by eliminating the unused power between the channels. As such, the peak spectral density is not limited by the total output power that can be extracted from the gain element in a BLS device. Providing periodic individual spectral slices 223 can loosen requirements on accuracy of wavelength channel alignment in WDM MUX/De-MUXes that reduces the manufacturing cost of a WDM system. Shaping the individual spectral slices 223, so that there is no optical power at the edges of the wavelength channels can further reduce the cross talk and loosen the accuracy requirements on the alignment of wavelength channels in the WDM system. For one embodiment, to completely remove crosstalk between adjacent channels in a WDM-PON system, the widths of individual spectral slices 223 from the BLS are made narrower than the spectral channel widths used in the WDM-PON system. For one embodiment, individual spectral slices 223 have widths that are in the approximate range of 5% to 95% of the widths of the spectral channels used in the WDM-PON systems. For one embodiment, the width of the spectral slice 223 is defined as a difference ("$\Delta\lambda$") between wavelengths $\lambda 2$ and $\lambda 1$, wherein each of the wavelengths $\lambda 2$ and $\lambda 1$ are determined at a fraction of the BLS output power 222 ("P1") of the spectral slice, as shown in FIG. 2C. For example, wavelengths $\lambda 2$ and $\lambda 1$ may be determined at 50%, 25%, or any other fraction of the BLS output P1. For one embodiment, individual spectral slices 223 have widths that are in about 50% of the widths of the spectral channels used in the WDM-PON systems. For one embodiment, individual spectral slices 223 have widths that are smaller than the spacing between WDM channels.

For one embodiment, the periodic spectral filter, such as periodic spectral filters 202 and 212, can be one or more arrayed waveguide gratings (AWGs), etalons, interferometers, e.g., Mach-Zehnder interferometers, Michelson interferometers, Bragg filters, the like optical elements, or any combination thereof.

For one embodiment, the optical gain element, such as optical gain elements 201 and 211, can be one or more semiconductor optical amplifiers ("SOAs"), erbium doped fiber amplifiers ("EDFA"), light emitting diodes ("LEDs") made of organic materials, electron clouds, any other active medium that provides optical gain, or any combination thereof.

Figure 3:
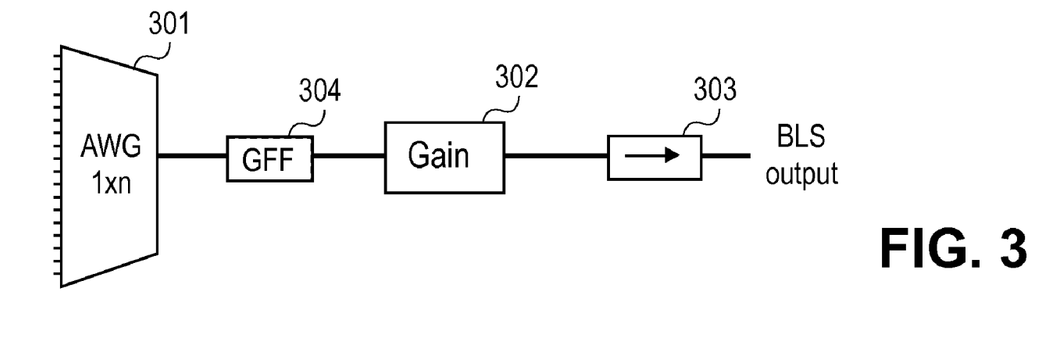
FIG. 3 is a block diagram of one embodiment of a periodic broadband light source that adjusts a global shape of the output spectrum.

FIG. 3 is a block diagram of one embodiment of a periodic BLS that adjusts a global shape of the output spectrum. As shown in FIG. 3, periodic BLS 300 includes a periodic reflective spectral filter 301, optical gain element 302, isolator 303, and a GFF 304. For one embodiment, periodic reflective spectral filter 301 is a reflective 1x n AWG filter, as shown in FIG. 3. The use of the AWG filter represents a low-cost solution for manufacturing of WDM-PONs. The AWG element can be used in other parts of a WDM-PON system (not shown). For example, the AWG element is used as a wavelength division multiplexer/de-multiplexer ("WDM Mux/De-Mux") at remote node and central office locations. That is, the same integrated optical chip that includes the AWG element is used for multiple purposes that decreases the cost and increases its manufacturing volume for WDM PONs. For one embodiment, to optimize performance of the WDM PON system, the AWG chip of periodic reflective filter 301 has a different spectral shape compared to the chips used for the Mux/Demuxs (not shown) in the WDM-PON system. For one embodiment, periodic reflective filter 301 is an AWG chip of an athermal design having built in temperature compensation that minimizes the wavelength shift of the spectral slices with varying temperature. For another embodiment, periodic reflective filter 301 is a standard thermally varying AWG element that uses a wavelength stabilizing technique, e.g., temperature control (not shown). A 1xn AWG element is a device with one input and a plurality ("n") of outputs. For one embodiment, periodic reflective filter 301 is a 1xn AWG element that has a reflective surface located at the outputs of n waveguides on the AWG chip, so that fibers for the "n" output are not needed. This can lower the packaging cost of the AWG reflector since it does not require pigtailing to "n" output fibers. GFF can be placed at either side of gain element 302. For one embodiment, GFF 304 is placed between filter 301 and gain element 302, as shown in FIG. 3. For another embodiment (not shown), the GFF is placed between gain element 302 and isolator 303. For one embodiment, GFF 304 includes one or more thin-film dielectric interference structures. Isolator 303 is used to prevent reflections from affecting the output power and spectral shape of the light from gain element 302.

Figure 4A:
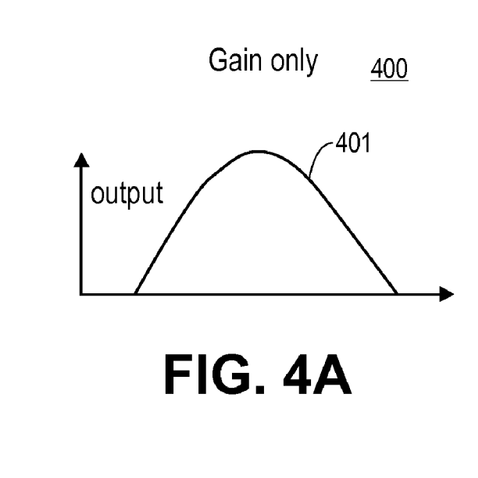
FIG. 4A is a diagram illustrating an output of one embodiment of a broadband light source having only a gain element.

FIG. 4A is a diagram illustrating an output of one embodiment of a broadband light source having only a gain element. As shown in FIG. 4A, output 401 has a single continuous broadband spectrum 401 against wavelength $\lambda$.

Figure 4B:
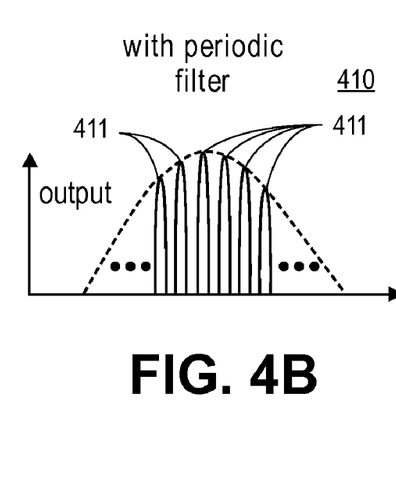
FIG. 4B is a diagram illustrating an output of one embodiment of a broadband light source having a gain element and a periodic filter.

FIG. 4B is a diagram illustrating an output of one embodiment of a broadband light source having a gain element and a periodic filter. As shown in FIG. 4B, output 410 has a combed spectrum with a plurality of individual narrowband spectral slices 411. These individual narrowband spectral slices 411 match the channel locations and spectral widths of the individual channels in a WDM-PON system, as described in further detail below. For one embodiment, the locations of the spectral slices 411 are aligned with the International Telecommunication Union ("ITU") wavelength grid (not shown). For one embodiment, to improve crosstalk between adjacent channels in a WDM-PON system, the individual spectral slices 411 from the BLS are made narrower than the spectral channel widths used in the WDM-PON system.

Figure 4C:
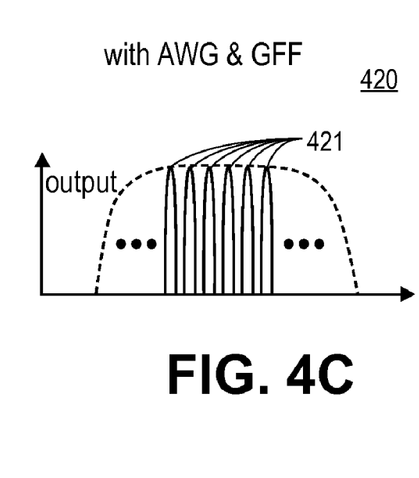
FIG. 4C is a diagram illustrating an output of one embodiment of a periodic broadband light source having a gain element, a periodic filter, and a gain flattening filter.

FIG. 4C is a diagram illustrating an output 420 of one embodiment of a periodic broadband light source having a gain element, a periodic filter, and a GFF, as described with respect to FIG. 3. The GFF can be used to adjust the global shape of the periodically sliced ("combed") spectrum, for example, to flatten and equalize the heights of the individual spectral slices 411. As shown in FIG. 4C, the heights of individual spectral slices 421 are equalized using the gain flattening filter.

For one embodiment, the global shape of the combed spectrum can be adjusted without using the GFF. For one embodiment, the adjusting of the global shape of the combed spectrum, for example, flattening or equalizing of the individual spectral slices, can be performed by adjusting the individual reflectivities from the "n" output waveguides of the AWG periodic filter. This can be done either on an individual basis or in a batch process. For example, a reflective metal coating can be deposited onto the output facet of the waveguides of the AWG periodic filter where the thickness of the coating can be made to vary as a function of distance. For another embodiment, the reflectivities at the output interface for each waveguide can be made constant, and a different loss mechanism can be included in each of the waveguides. This can be done at low cost in the mask generation of the AWG chip.

Figure 5A:
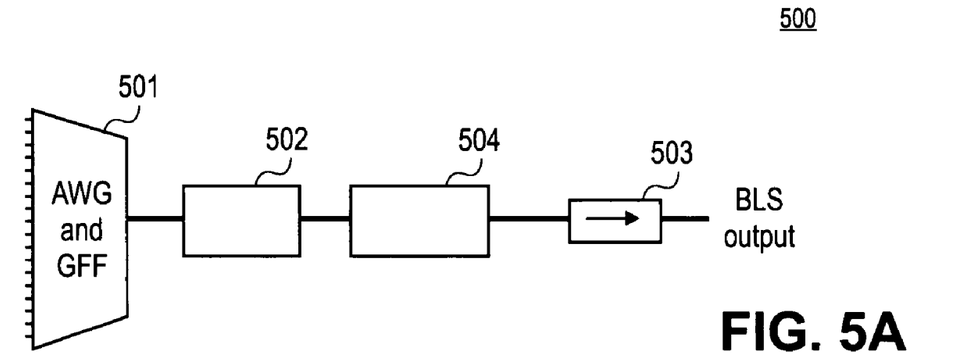
FIG. 5A is a block diagram of one embodiment of a periodic broadband light source that reduces a relative intensity noise ("RIN") on each of the individual spectral slices.

FIG. 5A is a block diagram of one embodiment of a periodic BLS that reduces a relative intensity noise ("RIN") on each of the individual spectral slices. As shown in FIG. 5A, the periodic BLS has a periodic reflective filter 501, optical gain element 502, isolator 503, and optical amplifier 504. For one embodiment, optical gain element 502 is a fast time-constant saturating semiconductor optical amplifier ("SOA"). By operating the SOA in a deeply saturated condition, intensity fluctuations can be reduced within the response time of the saturating amplifier. For one embodiment, optical gain element 502 is an SOA that has a fast response time in the order of nanoseconds e.g., 0.1-100 nsec, that can effectively reduce the noise within a nanosecond data bit (e.g., for data modulation rates in the Gigabit region). For one embodiment, optical amplifier 504 is used to boost the output power level of the periodically filtered BLS output, for example, for WDM PONs having a long distance reach. For one embodiment, optical amplifier 504 has a substantially slower response time than gain element 502. For one embodiment, optical amplifier 504 has the response time in the order of milliseconds, e.g., 1-100 milliseconds. For one embodiment, amplifier 504 is an EDFA. As shown in FIG. 5A, periodic reflective filter 501 has an AWG filter that includes a GFF functionality, as described above. For one embodiment, the AWG filter and GFF are incorporated into a single integrated optical chip, e.g., a Planar Lightwave Circuit ("PLC").

Isolator 503 is used to prevent reflections from affecting the output power and spectral shape of the light from optical amplifier 504. For one embodiment, periodic reflective filter 501, optical gain element 502, isolator 503, and optical amplifier 504 are grown on a single semiconductor substrate that includes silicon, indium phosphide, or a combination thereof.

Figure 5B:
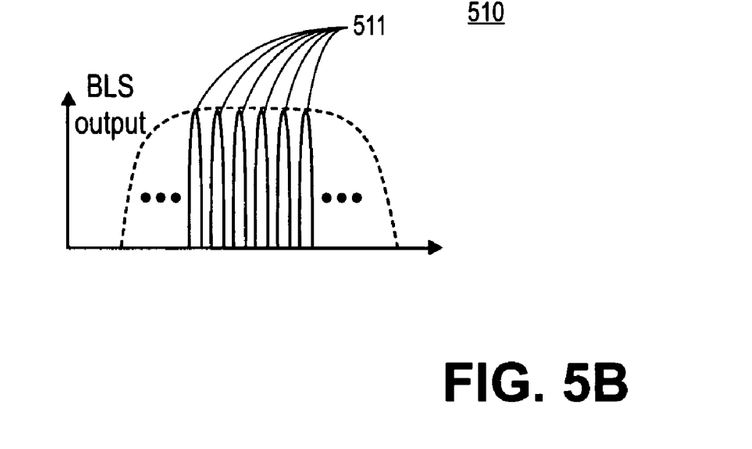
FIG. 5B is a diagram illustrating an output of one embodiment of a periodic broadband light source that reduces a relative intensity noise ("RIN") on each of the individual spectral slices.

FIG. 5B is a diagram illustrating a combed output of a one embodiment of periodic BLS 500. As shown in FIG. 5B, the RIN on each of individual spectral slices 511 is minimized, as described above. As shown in FIG. 5B, the global shape of the individual spectral slices 511 is adjusted, as described above.

Figure 6A:
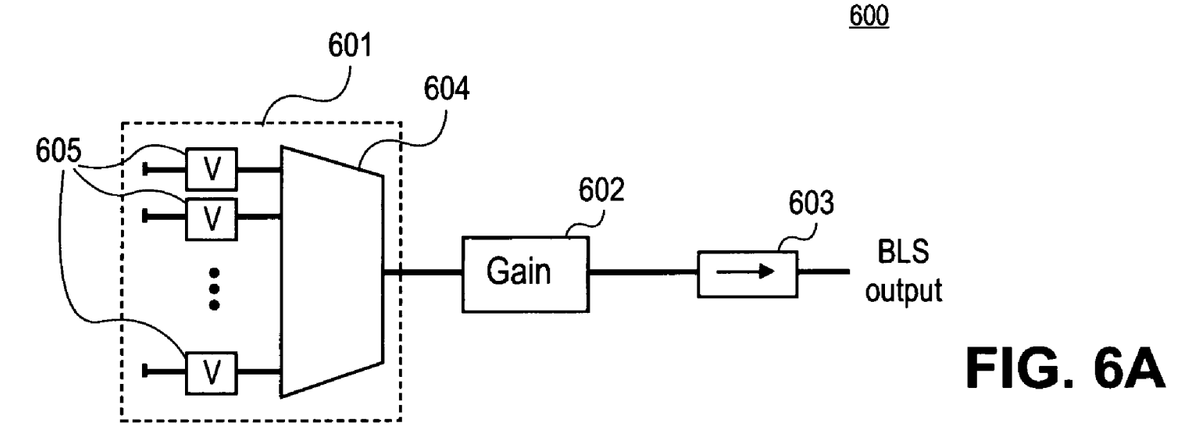
FIG. 6A is a block diagram of one embodiment of a periodic broadband light source that controls the output powers in each of the individual spectral slices and reduces a relative intensity noise ("RIN") on each of the individual spectral slices.

FIG. 6A is a block diagram of one embodiment of a periodic BLS that controls the output powers in each of the individual spectral slices and reduces a relative intensity noise ("RIN") on each of the individual spectral slices. As shown in FIG. 6A, periodic BLS includes a periodic reflective spectral filter 601, an optical gain element 602, and an isolator 603. Periodic filter 601 adjusts an optical power in each of the spectral slices. As shown in FIG. 6, periodic filter 601 has a 1×n AWG filter 604. One or more variable optical control elements 605 are coupled to each of the "n" waveguide outputs of the AWG element 604 to individually adjust an optical power in each of the spectral slices. For another embodiment, periodic filter 601 has a Fabry-Perot etalon (not shown) coupled to one or more variable optical control elements. For one embodiment, the optical power within each of the individual spectral slices is adjusted by controlling the reflectivity within each of the "n" waveguide outputs of the AWG 604. For one embodiment, variable optical control elements 605 are variable reflectivity elements, for example, variable transmission devices with a fixed external reflectivity. For another embodiment, optical control elements 605 have the reflectivity incorporated within their functionality.

For one embodiment, the optical power is adjusted by controlling a loss within the individual spectral slices. For another embodiment, the optical power is adjusted by controlling a gain within the individual spectral slices. For example, variable optical control elements 605 can be variable attenuators, variable optical amplifiers, or any combination thereof. For one embodiment, variable optical control elements 605 are, for example, thermally tuned waveguides, electro-optic waveguides, Micro Electro-Mechanical Structures ("MEMS"), devices based on electro-absorption effects, and the like. For one embodiment, variable optical control elements 605 are SOAs (semiconductor optical amplifiers) that are operated in the gain saturated regime to reduce RIN on each of individual spectral slices. For one embodiment, optical control elements 605 include heaters to control the amount of light that passes through the waveguides. For example, by heating a waveguide junction the light may be diverted off in one direction, and not in the other direction. For one embodiment, the shapes of the individual spectral slices can be tailored using control elements 605. Control elements 605 can tailor the shapes of the individual spectral slices to be, for example, sinusoidal, Gaussian and flat-topped. For one embodiment, optical control elements 605 and 1×n AWG filter are all integrated on a single integrated optical chip that reduces the cost of the periodic BLS. For one embodiment, silica, e.g., SiO2, or polymer waveguides are used to integrate the variable attenuators and the AWG. For one embodiment, Indium Phosphide (InP) waveguides are used for the combined integration of SOAs with the AWG. For another embodiment, optical control elements 605 and filter 604 are individual components coupled with optical fibers.

Figure 6B:
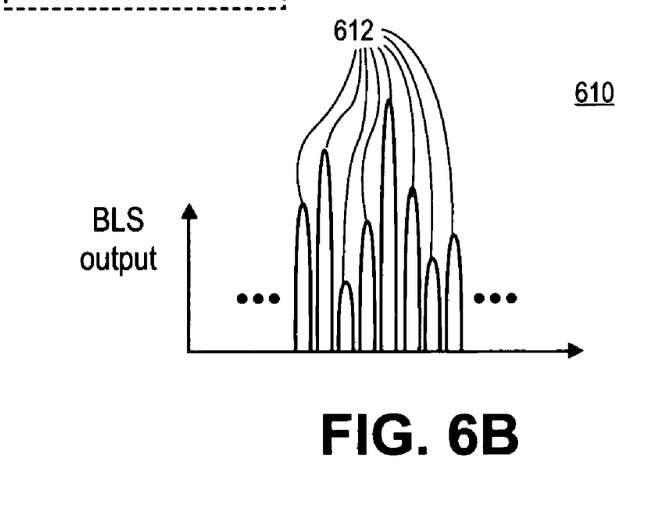
FIG. 6B is a diagram illustrating one embodiment of an output of a periodic broadband light source against a wavelength that controls the output powers in each of the individual spectral slices and reduces a relative intensity noise ("RIN") on each of the individual spectral slices.

FIG. 6B is a diagram illustrating a combed output of one embodiment of a periodic BLS 600 against a wavelength λ. As shown in FIG. 6B, the output power of each of individual spectral slices 612 can be adjusted using the variable optical control elements, as described above.

Figure 7:
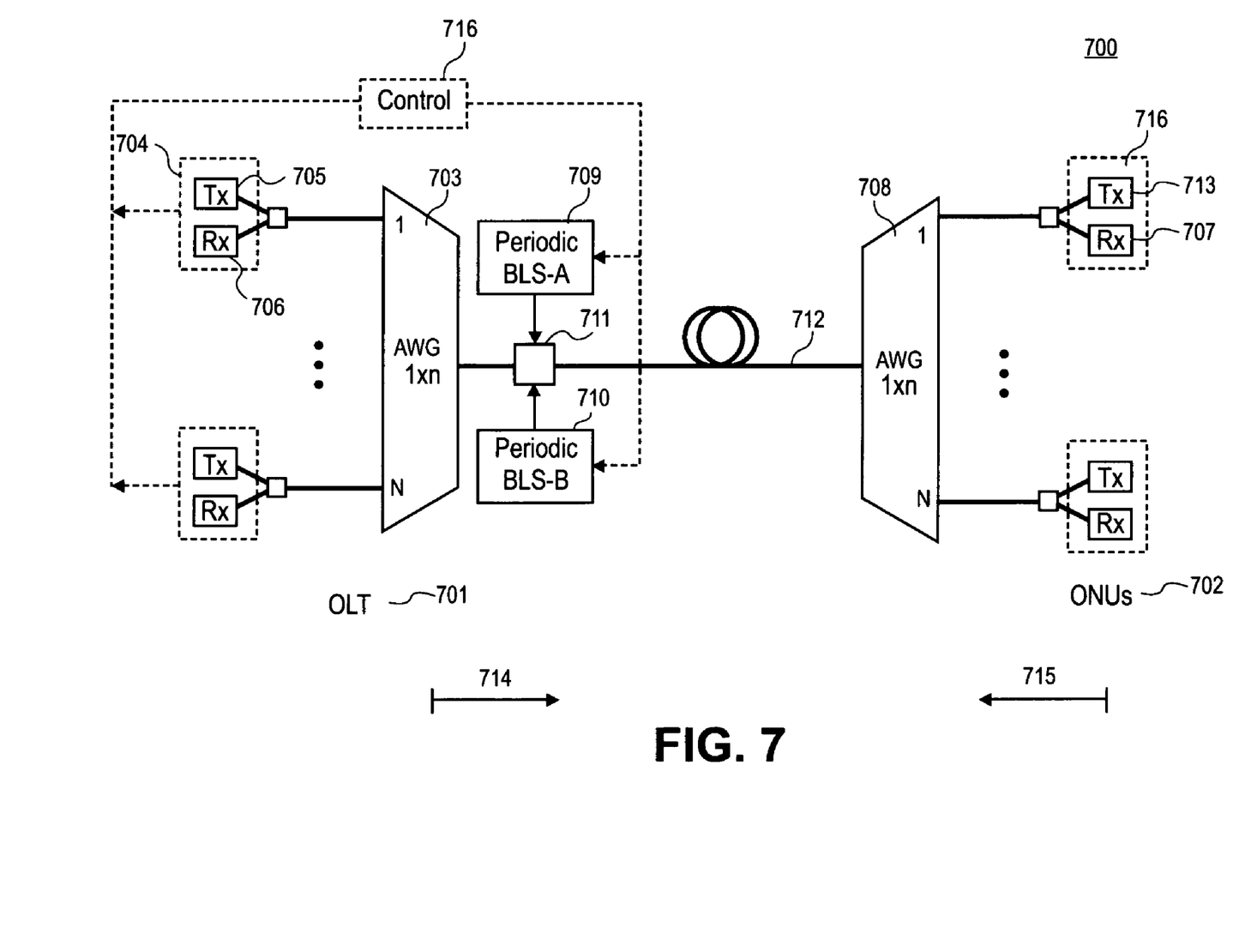
FIG. 7 is a block diagram of one embodiment of a WDM-PON system that includes one or more periodic broadband light sources.

FIG. 7 is a block diagram of one embodiment of a WDM-PON system that includes one or more periodic broadband light sources. As shown in FIG. 7, WDM-PON system 700 includes an Optical Line Termination ("OLT") unit 701 located at a central office and a plurality of Optical Network Units ("ONUs") 702 located at remote sites. OLT 701 includes a first group of transceivers, such as a transceiver 704, to send a first set of optical signals into a downstream direction 714 from OLT 701 to ONUs 702 along an optical transmission medium 712, for example, an optical fiber, air, or any other optical transmission medium. Transceiver 704 includes a transmitter Tx 705 and receiver Rx 706. Tx 705 is used to send data to ONUs 702. Rx 706 is used to receive data from ONUs 702. As shown in FIG. 7, a 1x n wavelength division multiplexer/de-multiplexer ("WDM MUX/De-MUX") 703 is coupled to the group of transceivers, such as a transceiver 704. As shown in FIG. 7, WDM MUX/De-MUX has a plurality ("n") of wavelength channels. A periodic broadband light source ("BLS") 709 is coupled to WDM MUX/De-MUX 704 to send individual spectral slices of light into direction 715 to wavelength lock one or more transmitters Tx, such as transmitter 705. For one embodiment, periodic BLS source 709 generates individual spectral slices within an A-band, for example, from about 1420 nm to about 1455 nm. The individual spectral slices generated by periodic BLS 709 are automatically adjusted to match wavelength channels 1 to n of WDM MUX/De-MUX 704. Because the width of the individual spectral slice is not greater than the width of the wavelength channel, the optical crosstalk between adjacent wavelength channels is removed. That is, periodic BLS generating individual spectral slices to wavelength lock transmitters Tx reduces the optical crosstalk between adjacent channels by removing injected light near the outer edges of each channel. The peak spectral density within each wavelength channel is increased by transferring the unused optical power between wavelength channels into the center of each channel. The wavelength accuracy of the system's Mux/Demuxs can be reduced by only providing injected BLS power at the center of each wavelength channel. For one embodiment, MUX/DMUX 704 is an AWG with a free spectral range ("FSR") to multiplex/demultiplex multiple wavelengths into each waveguide within the wavelength range from about 1280 nm to about 1650 nm. For one embodiment, MUX/DMUX 704 have the spacing between optical channels less than 10 nm. In one embodiment, MUX/DMUX 704 is an arrayed waveguide MUX/DMUX having the optical spacing between adjacent optical channels in the approximate range of 25 GHz to 200 GHz.

As shown in FIG. 7, another group of transceivers at ONUs 702, such as a transceiver 716, is used to send another set of optical signals into an upstream direction 715 to OLT 701 along optical transmission medium 712. Transceiver 716 includes a transmitter Tx 713 and receiver Rx 707. Tx 713 is used to send data to OLT 701. Rx 707 is used to receive data from OLT 701. A WDM MUX/De-MUX 708 is coupled to the group of transceivers at ONUs 702. As shown in FIG. 7, WDM MUX/De-MUX 708 has wavelength channels 1-n. A periodic BLS 710 is coupled to WDM MUX/De-MUX 708 to send individual spectral slices of the light into direction 714 to wavelength lock one or more transmitters at remote sites, such as transmitter 713. For one embodiment, periodic BLS filter 710 generates individual spectral slices within B-band, for example, from about 1530 nm to about 1565 nm. The individual spectral slices of light sent from periodic BLS 710 are adjusted to match wavelength channels WDM MUX/De-MUX 708. For one embodiment, one or more transmitters, such as Tx 705 and 713 include a wavelength locked light source. For one embodiment, the wavelength-locked light source of one or more transmitters, such as Tx 705 and 713, is operated below the lasing threshold when being suppressed by an injected individual spectral slice from the periodic BLS 710. The wavelength-locked light source may be a Fabry-Perot laser diode, reflective semiconductor amplifier, tunable laser, or any combination thereof, configured to operate below a lasing threshold to be wavelength locked to the spectral slice provided by the periodic BLS 710. As shown in FIG. 7, a control unit 716 is coupled to receivers of the group of transceivers, such as a receiver Rx 706, to periodic BLS 709, and to periodic BLS 710. Control unit 716 is an optional control circuit that can be used to dynamically control the individual spectral slices generated by periodic BLS 709 and periodic BLS 710 based on information received from receivers, such as receiver Rx 706. For one embodiment, control unit 716 controls optical power in each of the spectral slices. For another embodiment, control unit 716 controls a central wavelength in each of the spectral slices. For one embodiment, OLT 701 and remote ONUs 702 communicate with each other to control the power levels in each of the individual spectral slices. This control function can be implemented within the Operation, Administration and Management ("OAM") communication layer (not shown) between OLT 701 and ONUs 702. For one embodiment, the information associated with the power levels in each of the individual spectral slices is incorporated into separate (e.g., supervisory) packets of data to provide communication between OLT 701 and ONUs 702.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A broadband light source, comprising:
    an optical gain element to generate a light, wherein the optical gain element has a first port and a second port, and wherein the light is a spontaneous emission; and
    a periodic filter coupled to the first port of the optical gain element to filter the light into a plurality of individual spectral slices, wherein the plurality of individual spectral slices of the spontaneous emission are output through the second port, wherein a power of the light in each of the individual spectral slices is adjustable, wherein the periodic filter comprises an array of waveguides, wherein ends of the waveguides are metallized to adjust reflections.

2. The broadband light source of claim 1, wherein the periodic filter is a reflective filter.

3. The broadband light source of claim 1, wherein the periodic filter is a wavelength stabilized filter.

4. The broadband light source of claim 1, wherein the light passes through the optical gain element not more than two times.

5. The broadband light source of claim 1, wherein the periodic filter has
    one or more optical power control elements coupled to control an optical power in each of the spectral slices.

6. The broadband light source of claim 1, further comprising
    an isolator coupled to the optical gain element.

7. The broadband light source of claim 1, wherein the periodic filter includes an arrayed waveguide grating, an etalon, an interferometer, a Bragg filter, or any combination thereof.

8. The broadband light source of claim 1, wherein the optical gain element includes a semiconductor optical amplifier, a fiber amplifier, or any combination thereof.

9. The broadband light source of claim 1, further comprising
    a gain flattening filter coupled to the optical gain element.

10. The broadband light source of claim 1, further comprising
    an optical amplifier coupled to the optical gain element.

11. A broadband light source, comprising:
- an optical gain element having a first port and a second port to generate a spontaneous emission light, wherein the optical gain element has a first response time;
- a periodic filter coupled to the first port of the optical gain element to filter the spontaneous emission light into a plurality of individual spectral slices, wherein the periodic filter has one or more control elements to control an output power of the light in each of the individual spectral slices, wherein the plurality of individual spectral slices of the spontaneous emission light are output through the second port; and
- an optical amplifier coupled to the second port of the optical gain element, wherein the optical amplifier has a second response time, wherein the first response time is substantially faster than the second response time to reduce a relative intensity noise ("RIN") on each of the individual spectral slices.

12. The broadband light source of claim 11, wherein the periodic filter is a reflective filter.

13. The broadband light source of claim 11, wherein the periodic filter and the one or more control elements are combined into a single integrated optical chip.

14. The broadband light source of claim 11, wherein a control element of the one or more control elements includes a variable reflectivity element.

15. The broadband light source of claim 11, wherein a control element of the one or more control elements includes a variable attenuator, a variable optical amplifier, or any combination thereof.

16. The broadband light source of claim 11, further comprising
an isolator coupled to the optical gain element.

* * * * *